US012523095B2

(12) United States Patent
Moss et al.

(10) Patent No.: US 12,523,095 B2
(45) Date of Patent: Jan. 13, 2026

(54) LADDERS AND LADDER BRACING

(71) Applicant: Little Giant Ladder Systems, LLC, Springville, UT (US)

(72) Inventors: N. Ryan Moss, Mapleton, UT (US); Benjamin Cook, Provo, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 148 days.

(21) Appl. No.: 18/457,167

(22) Filed: Aug. 28, 2023

(65) Prior Publication Data

US 2023/0399893 A1 Dec. 14, 2023

Related U.S. Application Data

(63) Continuation of application No. 16/460,450, filed on Jul. 2, 2019, now Pat. No. 11,788,354.

(60) Provisional application No. 62/695,653, filed on Jul. 9, 2018.

(51) Int. Cl.

| | |
|---|---|
| ***E06C 7/10*** | (2006.01) |
| ***E06C 1/12*** | (2006.01) |
| ***E06C 1/22*** | (2006.01) |
| ***E06C 1/32*** | (2006.01) |

(52) U.S. Cl.
CPC .................. *E06C 7/10* (2013.01); *E06C 1/12* (2013.01); *E06C 1/22* (2013.01); *E06C 1/32* (2013.01)

(58) Field of Classification Search
CPC ..... E06C 7/10; E06C 1/02; E06C 1/04; E06C 1/06; E06C 1/10; E06C 1/12; E06C 1/14; E06C 1/16; E06C 1/18; E06C 1/20; E06C 1/22; E06C 1/32; E06C 1/30
See application file for complete search history.

(56) References Cited

U.S. PATENT DOCUMENTS 501,406 A 7/1893 Campbell
559,630 A * 5/1896 Stephenson ............... E06C 1/22 182/175

(Continued)

FOREIGN PATENT DOCUMENTS

KR 200146389 Y1 6/1999

OTHER PUBLICATIONS

International Search Report and Written Opinion for International Application No. PCT/US2019/040327, dated Sep. 30, 2019.

*Primary Examiner* — Colleen M Chavchavadze
*Assistant Examiner* — Shiref M Mekhaeil
(74) *Attorney, Agent, or Firm* — Dorsey & Whitney, LLP

(57) ABSTRACT

A ladder with bracing is provided. In one embodiment, the ladder may include a first rail assembly comprising a pair of inner rails and a pair of outer rails, the pair of inner rails being slidably disposed in a upper portion of pair of outer rails, wherein a rear surface of each of the pair of outer rails lies in a common plane. A first plurality of rungs may be coupled between the pair of inner rails, and a second plurality of rungs coupled between the pair of outer rails. A brace may extend between and be coupled to the pair of outer rails, wherein the brace includes a first ramped surface, the first ramped surface having a first portion spaced away from the common plane, a second portion immediately adjacent the common plane, and a transition portion extending between the first portion and the second portion.

13 Claims, 7 Drawing Sheets

(56) References Cited

U.S. PATENT DOCUMENTS

| | | | | | |
|---|---|---|---|---|---|
| 1,068,805 | A * | 7/1913 | Mosiman | B60R 3/00 182/180.1 |
| 2,153,127 | A * | 4/1939 | Arps | E06C 1/12 182/178.2 |
| 2,257,863 | A | 10/1941 | Schwarz et al. | |
| 2,525,412 | A * | 10/1950 | Jasper | E06C 7/10 182/216 |
| 4,210,224 | A | 7/1980 | Kummerlin et al. | |
| 5,458,068 | A * | 10/1995 | Kilpatrick | B65D 19/0012 108/56.1 |
| 5,636,706 | A * | 6/1997 | Plotner | E06C 1/12 182/220 |
| 6,422,340 | B1 * | 7/2002 | Grundler | E06C 9/08 182/84 |
| 6,698,550 | B2 * | 3/2004 | Crain | E06C 1/22 182/201 |
| 8,186,481 | B2 * | 5/2012 | Moss | E06C 7/50 182/25 |
| 8,701,828 | B1 * | 4/2014 | Matthew | E06C 7/182 182/172 |
| 9,163,455 | B2 * | 10/2015 | Moss | E06C 7/04 |
| 9,309,718 | B1 * | 4/2016 | Matthew | E06C 1/16 |
| 9,422,767 | B2 * | 8/2016 | Russell | E06C 1/16 |
| 9,797,194 | B2 | 10/2017 | Moss et al. | |
| 10,487,576 | B2 * | 11/2019 | Ballard | E06C 1/22 |
| 10,858,848 | B2 * | 12/2020 | Woodward | E04G 1/30 |
| D908,924 | S * | 1/2021 | Melton | D25/64 |
| 2003/0188923 | A1 * | 10/2003 | Moss | E06C 7/085 182/163 |
| 2005/0274571 | A1 * | 12/2005 | Simpson | E06C 7/083 182/23 |
| 2006/0124398 | A1 * | 6/2006 | Parker | E06C 1/387 182/207 |
| 2006/0272896 | A1 * | 12/2006 | Rajewski | E06C 1/36 182/127 |
| 2006/0278474 | A1 * | 12/2006 | Cumbie | E06C 1/12 182/207 |
| 2007/0181369 | A1 * | 8/2007 | Gibson | E06C 7/18 182/165 |
| 2007/0240935 | A1 * | 10/2007 | O'Brien | E06C 7/165 182/120 |
| 2009/0229918 | A1 * | 9/2009 | Moss | E06C 1/30 182/180.1 |
| 2011/0011679 | A1 * | 1/2011 | Leng | E06C 7/086 182/194 |
| 2012/0160609 | A1 * | 6/2012 | Moss | E06C 7/06 182/156 |
| 2012/0211305 | A1 * | 8/2012 | Moss | E06C 1/39 182/180.1 |
| 2013/0186710 | A1 * | 7/2013 | Moss | E06C 7/185 182/104 |
| 2014/0224585 | A1 * | 8/2014 | Russell | E06C 1/18 182/180.1 |
| 2015/0068842 | A1 * | 3/2015 | Moss | E06C 7/423 292/341.15 |
| 2017/0044780 | A1 * | 2/2017 | Foley | E04G 1/34 |
| 2017/0254145 | A1 * | 9/2017 | Ballard | E06C 1/22 |
| 2017/0328131 | A1 * | 11/2017 | Woodward | E06C 1/393 |
| 2017/0356244 | A1 * | 12/2017 | Peterson | E06C 1/22 |
| 2018/0094488 | A1 | 4/2018 | Major et al. | |
| 2018/0163467 | A1 * | 6/2018 | Parker | E06C 1/383 |
| 2018/0171648 | A1 * | 6/2018 | Woodward | E04G 1/15 |
| 2019/0234144 | A1 * | 8/2019 | Badowski | E06C 1/06 |
| 2019/0368271 | A1 * | 12/2019 | Lentine | E06C 1/12 |
| 2019/0390518 | A1 * | 12/2019 | Yoo | E06C 7/44 |
| 2020/0115961 | A1 * | 4/2020 | Foley | E06C 7/48 |
| 2021/0062579 | A1 * | 3/2021 | Hyma | E06C 1/20 |
| 2021/0115734 | A1 * | 4/2021 | Russell | E06C 7/50 |

* cited by examiner

LADDERS AND LADDER BRACING

CROSS-REFERENCE TO RELATED APPLICATIONS

The present application is a continuation of U.S. patent application Ser. No. 16/460,450, which was filed on Jul. 2, 2019 and which claims the benefit of U.S. Provisional Patent Application No. 62/695,653, filed on Jul. 9, 2018, and the disclosures of each of which are herein incorporated by reference in their entireties.

BACKGROUND

Ladders are conventionally utilized to provide a user thereof with improved access to elevated locations that might otherwise be inaccessible. Ladders come in many shapes and sizes, such as straight ladders, extension ladders, stepladders, and combination step and extension ladders. So-called combination ladders (sometimes referred to as articulating ladders) may incorporate, in a single ladder, many of the benefits of multiple ladder designs.

Straight ladders, extension ladders or combination ladders (when configured as straight or an extension ladder), are ladders that are conventionally positioned against an elevated surface, such as a wall or the edge of a roof, to support the ladder at a desired angle. A user then ascends the ladder to obtain access to an elevated area, such as to an upper area of the wall or access to the roof. A pair of feet or pads, one being coupled to the bottom of each side rail, is conventionally used to engage the ground, a floor or some other supporting surface.

Step ladders and combination ladders (when configured as a step ladder) are generally considered to be self-supporting in that they include a first rail assembly which includes steps or rungs that is coupled to a second rail assembly or other support structure. The first and second rail assemblies are typically positioned at an acute angle relative to each other so that there are multiple feet or support members—at least three, but typically four—to support the ladder in a free standing position. Thus, the ladder may be used without the need to lean the ladder against a wall or other vertical support structure.

Combination ladders provide considerable flexibility in the ability to utilize the ladder in a variety of configurations and situations. For example, combination ladders are often capable of being configured as step ladders of varying sizes or heights, straight ladders or extension ladders, as well as other configurations. In many embodiments, combination ladders include rail assemblies that slide relative to each other, providing the ability to use the ladder at different heights (in either a step ladder or extension ladder configuration).

There is a continuing desire in the industry to provide improved functionality of ladders while maintaining or improving the safety and stability of such ladders. Thus, it would be advantageous to provide ladders with adjustable components that enable the ladder to be used on a variety of support surfaces while also perhaps providing enhanced stability. It would also be advantageous to provide adjustment mechanisms for ladders that enhance the utility of the ladder. Further, it would be advantageous to provide methods related to the manufacture and use such ladders, components and mechanisms.

SUMMARY

The present disclosure provides ladders and bracing for ladders, including combination ladders having rail assemblies that are slidable relative to one another.

In one embodiment of the present disclosure, a ladder is provided that includes a first rail assembly having a pair of inner rails and a pair of outer rails, the pair of inner rails being slidably disposed in a upper portion of pair of outer rails, wherein a rear surface of each of the pair of outer rails lies in a common plane. A first plurality of rungs is coupled between the pair of inner rails, a second plurality of rungs coupled between the pair of outer rails. At least one brace extends between and is coupled to the pair of outer rails, the at least one brace including a first ramped surface, the first ramped surface having a first portion spaced away from the common plane, a second portion immediately adjacent the common plane, and a transition portion extending between the first portion and the second portion.

In one embodiment, the transition portion includes a linear surface.

In one embodiment, a cross-sectional profile of the at least one brace exhibits a geometry of an irregular pentagon.

In one embodiment, the transition portion includes a curved surface. In one embodiment, the curved surface is convex. In one embodiment, the curved surface is concave.

In one embodiment, the first ramped surface of the at least one brace extends substantially across an entire length of the at least one brace as it extends between the pair of outer rails.

In one embodiment, the ladder further comprises a second rail assembly, the second rail assembly including a second pair of inner rails and a second pair of outer rails, the second pair of inner rails being slidably disposed in a upper portion of second pair of outer rails, wherein a rear surface of each of the second pair of outer rails lies in a second common plane, a third plurality of rungs coupled between the second pair of inner rails, a fourth plurality of rungs coupled between the second pair of outer rails, at least additional one brace extending between and coupled to the second pair of outer rails, the at least one additional brace including a second ramped surface, the second ramped surface having a first portion spaced away from the second common plane and a second portion immediately adjacent the second common plane, and a transition portion extending between the first and second portions of the ramped surface of the at least one additional brace.

In one embodiment, the ladder further comprises pair of hinges coupling the first assembly with the second assembly.

In one embodiment, the at least one brace is welded to each of the pair of outer rails.

In one embodiment, the at least one brace is mechanically fastened to each of the pair of outer rails.

In one embodiment, the transition portion forms an angle of between approximately 10 degrees and approximately 45 degrees with the common plane.

In one embodiment, the transition portion forms an angle of between approximately 20 degrees and approximately 35 degrees with the common plane.

In one embodiment, the transition portion forms an angle of approximately 40 degrees with the common plane.

In one embodiment, the upper portion of the ramped surface is spaced from the common plane a distance of between approximately ⅛ of an inch and approximately ⅜ of an inch.

In one embodiment, the at least one brace further includes a second ramped surface, the second ramped surface having a first portion spaced away from the common plane and a second portion immediately adjacent the common plane, and a transition portion extending between the first portion and the second portion.

In one embodiment, the ladder further comprises a first radiused transition between the first ramped surface and a first adjacent surface and second radiused transition between the first ramped surface and a second adjacent surface.

In one embodiment, the first radiused transition and the second transition surface each exhibit a radius of approximately 0.05 inch and approximately 0.1 inch.

In one embodiment, first radiused transition exhibits a radius of approximately and 0.05 inch and the second radiused transition exhibits a radius of approximately 0.1 inch.

In one embodiment, the at least one brace exhibits a thickness of approximately ¼ inch and a height of between approximately 1 inch and approximately 1.5 inches.

Feature, elements, aspects or components of one embodiment may be combined with features, elements, aspects or components of other embodiments without limitation.

BRIEF DESCRIPTION OF THE DRAWINGS

The foregoing and other advantages of the invention will become apparent upon reading the following detailed description and upon reference to the drawings in which.

DESCRIPTION OF EMBODIMENTS

Figure 1:
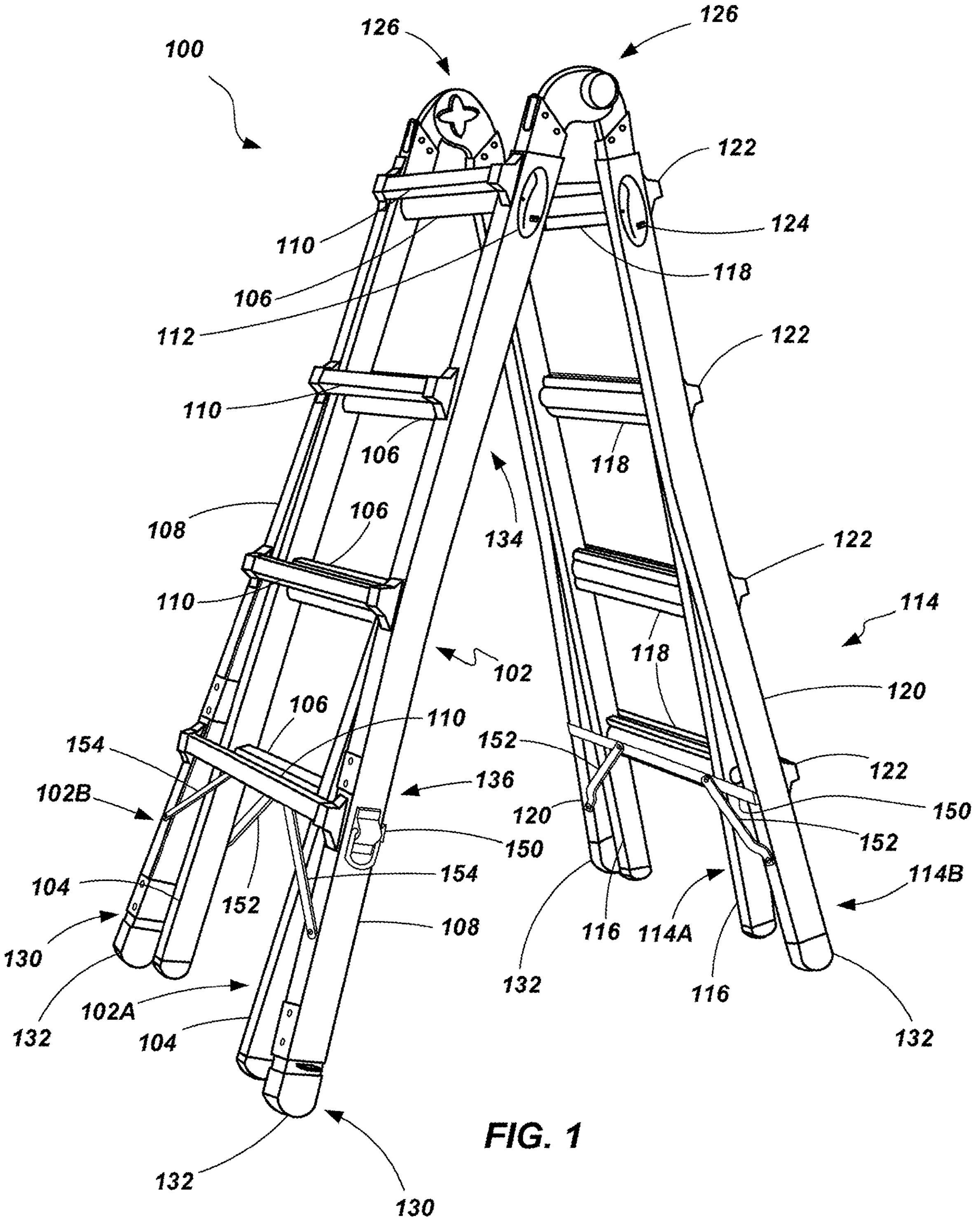
FIG. 1 is a perspective view of a ladder in accordance with an embodiment with the present invention.

Referring to FIG. 1, a combination ladder 100 is shown. The ladder 100 includes a first rail assembly 102 including an inner assembly 102A slidably coupled with an outer assembly 102B. The inner assembly 102A includes a pair of spaced apart rails 104 coupled with a plurality of rungs 106. Likewise, the outer assembly 102B includes a pair of spaced apart rails 108 coupled to a plurality of rungs 110. The rails 104 of the inner assembly 102A are slidably coupled with the rails 108 of the outer assembly 102B. The inner and outer assemblies 102A and 102B may be selectively locked relative to each other such that one or more of their respective rungs 106 and 110 are aligned with each other. A locking mechanism 112 may be configured to engage a portion of the inner rail assembly 102A and the outer rail assembly 102B so as to selectively lock the two assemblies 102A and 102B relative to each other. While only a single locking mechanism 112 is shown due to the perspective of the ladder represented in FIG. 1, a second, similar locking mechanism is coupled to the other side of the rail assembly 102.

The combination ladder 100 also includes a second rail assembly 114 that includes an inner assembly 114A slidably coupled with an outer assembly 114B. The inner assembly 114A includes a pair of rails 116 coupled with a plurality of rungs 118 and is configured similar to the inner assembly 102A of the first rail assembly 102 described hereinabove. Likewise, the outer assembly 114B includes a pair of rails 120 coupled with a plurality of rungs 122 and is configured similar to the outer assembly 102B of the first rail assembly 102 described hereinabove. Locking mechanisms 124 may be associated with inner and outer assemblies 114A and 114B to enable selective positioning of the inner assembly 114A relative to the outer assembly 114B as described hereinabove with respect to the first rail assembly 102.

Examples of exemplary locking mechanisms and inner/outer rail assemblies that may be used with the first and second rail assemblies 102 and 114 are described in U.S. Pat. No. 8,186,481, issued May 29, 2012, the disclosure of which is incorporated by reference herein in its entirety. While the locking mechanism described in U.S. Pat. No. 8,186,481 is generally described in conjunction with an embodiment of an adjustable step ladder, such a locking mechanism may by readily used with an embodiment such as the presently described combination ladder as well. Other examples of rail assemblies 102 and 114 (including inner and outer rail assemblies) as well as additional types of locking mechanism are described in U.S. Pat. No. 4,210,224 to Kummerlin, the disclosure of which is incorporated by reference in its entirety. Of course, other configurations of rail assemblies may be utilized. Another example of a locking mechanism is set forth in U.S. Patent Application Publication No. 20170254145, published on Sep. 7, 2017, the disclosure of which is incorporated by reference herein in its entirety.

The first rail assembly 102 and the second rail assembly 114 may be coupled to each other by way of a pair hinge mechanisms 126. Each hinge mechanism 126 may include a first hinge component coupled with a rail of the first rail assembly's inner assembly 102A and a second hinge component coupled with a rail of the second rail assembly's inner assembly 114A. The hinge components of a hinge mechanism 126 rotate about a pivot member such that the first rail assembly 102 and the second rail assembly 114 may pivot relative to each other. Additionally, the hinge mechanisms 126 may be configured to lock their respective hinge components (and, thus, the associated rails to which they are coupled) at desired angles relative to each other. Some non-limiting examples of a suitable hinge mechanisms described in U.S. Pat. No. 4,407,045 to Boothe, the disclosure of which is incorporated by reference herein in its entirety. Of course other configurations of hinge mechanisms are also contemplated as will be appreciated by those of ordinary skill in the art.

The combination ladder 100 is constructed so as to assume a variety of states or configurations. For example, using the locking mechanisms (112 or 124) to adjust a rail assembly (102 or 114) enables the ladder 100 to adjust in height. More specifically, considering the first rail assembly 102, as the rail assembly 102 is adjusted (with the outer assembly 102B being displaced relative to the inner assembly 102A) the associated locking mechanisms 112 engages the inner and outer assemblies (102A and 102B) when they are at desired relative positions, with the rungs (106 and 110) of the inner and outer assemblies (102A and 102B) at a desired vertical spacing relative to each other. At some of the adjustment heights of the rail assembly 102, at least some of their respective rungs (106 and 110) align with each other (such as shown in FIG. 1). The second rail assembly 114 may be adjusted in a similar manner.

Considering the embodiment shown in FIG. 1, adjustment of the rail assemblies 102 and 114 enables the ladder 100 to be configured as a step ladder with, for example, four effective rungs at a desired height (as shown in FIG. 1), or to be configured as a step ladder that is substantially taller having five, six, seven or eight effective rungs, depending on the relative positioning of the inner and outer assemblies. However, it is noted that the inner and outer rail assemblies (e.g., 102A and 102B) may be configured with more or fewer rungs than four. It is also noted that the first rail assembly 102 and the second rail assembly 114 do not have to be adjusted to similar heights (i.e., having the same number of effective rungs). Rather, if the ladder is used on an uneven surface (e.g., on stairs), the first rail assembly 102 may be adjusted to one height while the second rail assembly 114 may be adjusted to a different height in order to compensate for the slope of the supporting surface, for use on a set of stairs, or in a variety of other scenarios where the ground or support surface may exhibit a change in elevation between the first and second rails assemblies 102 and 114.

Additionally, the hinge mechanisms 126 provide for additional adjustability of the ladder 100. For example, the hinge mechanisms 126 enable the first and second rail assemblies 102 and 114 to be adjusted to a variety of angles relative to each other. As shown in FIG. 1, the first and second rail assemblies 102 and 114 may be configured at an acute angle relative to each other such that the ladder may be used as a self-supporting ladder, similar to a step ladder. However, the first and second rail assemblies 102 and 114 may be rotated or pivoted about the hinge mechanisms 126 so that they extend from one another in substantially the same plane (i.e., exhibiting an angle of substantially 180° with respect to each other) with the hinge mechanisms 126 locking them in such an orientation. When configured in this manner, the ladder 100 may be used as an extension ladder. Moreover, each of the first and second assemblies 102 and 114 are still adjustable as to height (i.e., through the relative displacement of their respective inner and outer assemblies). It is additionally noted that the rungs of the various assemblies (i.e., rungs 106, 110, 118 and 122) are configured to have support surfaces on both the tops and the bottoms thereof so as to enable their use in either a step ladder configuration or an extension ladder configuration.

The first rail assembly 102 (and/or the second rail assembly 114) may additionally include an integrated leveler mechanism 130 associated with each rail 108 of the outer assembly 102B. Additionally, each of the outer assemblies 102B and 114B include feet 132 associated with the extremities of their outer rails 108 and 120 (which may include an associated leveler mechanism 130). When incorporated, the leveler mechanisms 130 may be independently actuated to compensate for an uneven support surface (e.g., sloping ground, a step on one side of the ladder, etc) upon which the first assembly 102 may be positioned. Examples of leveling mechanisms and actuators that may be used with leveling mechanisms are described by U.S. Pat. No. 9,797,194 and U.S. Patent Application Publication No. 20180094488, the disclosures of which are incorporated by reference herein in their entireties.

The ladder 100 may include various brace members to provide a desired level of strength and/or rigidity in the ladder. For example, ladders may be rated based on their weight capacity (e.g., Type 1A being rated for 300 lbs., Type IAA being rated for 375 lbs., etc.). Additionally, in order to meet certain standards (e.g., ANSI standards), ladders may be required to meet different types of loading tests without exceeding specified limits of deflection or twisting. Thus, in one example, a cross brace 150 may extend between, and be fixedly coupled with, each of the rails 108 of the first outer assembly 102B, and a similar cross brace 150 may extend between and be fixedly coupled with, each of the rails 120 of the second outer assembly 114B. For example, in some embodiments, the cross-brace 150 may include a metal component (e.g., an aluminum or aluminum alloy, steel, etc.) that is welded to associated outer rails (108 or 120). In other embodiments, the cross-brace 150 may be riveted or otherwise mechanically fastened to the outer rails. In yet other embodiments, the cross-brace 150 may be formed of other materials, including plastic, and/or joined with the outer rails using an adhesive or using other material joining techniques.

In some embodiments, angle-braces 152 may extend between associated outer rails and the cross-brace 150. For example, as best seen with respect to the second rail assembly 114, angle braces 152 may be coupled to an outer rail 120 and extend to, and be coupled with, the cross-brace 150. As with the cross-brace 150, the angle-braces 152 may be made of a variety of materials (e.g., metal, plastic, composite materials) and may be joined with the rails 120 and cross-brace by any of a variety of techniques including those discussed above in association with the cross-brace 150.

In the embodiment shown in FIG. 1, the cross-brace 150 and the angle-braces 152 are coupled with the back surfaces of their associated rails (108 and 120)—opposite the location of the rungs (110 and 122, respectively). Further, as shown in FIG. 1, in some embodiments, the cross-brace 150 may be positioned at substantially the same elevation as, and extend substantially parallel with, the lowermost rung of a given assembly 102 or 114 (i.e., the rung closest to the feet 132 of an assembly 102 or 114). Additionally, some further angle-braces 154 may be coupled between the front surface of an outer rail (108 and 120) and an associated rung (110 and 122, respectively). The various braces may provide increased resistance to twisting or other deflection of the outer rails (108 and 120) when subjected to certain loading conditions.

When a cross-brace 150 is coupled to the back surface of a rail (108 or 120), due to various conditions, including some manufacturing tolerances, the lowermost portions of the rails (104 and 116) of the inner assemblies (102A and 114A) may interfere with, and even "catch" on the cross-braces 150 when an inner assembly is being lowered relative to its associated outer assembly. In other words, when a given assembly (102 or 114) is extended to increase the height of the ladder 100, and then collapsed towards the state shown in FIG. 1, it is possible that the inner rails (104 and 116) may catch or get hung up on the cross-brace 150, preventing it from completely collapsing. This can pose various problems including potential damage to the ladder 100.

In accordance with one embodiment of the present disclosure, the cross-brace includes at least one anti-catch feature at a location adjacent the inner rails (104 or 116) that enables the inner rails to easily slide past the cross-brace 150 during collapsing or shortening of the ladder 100.

Figure 2:
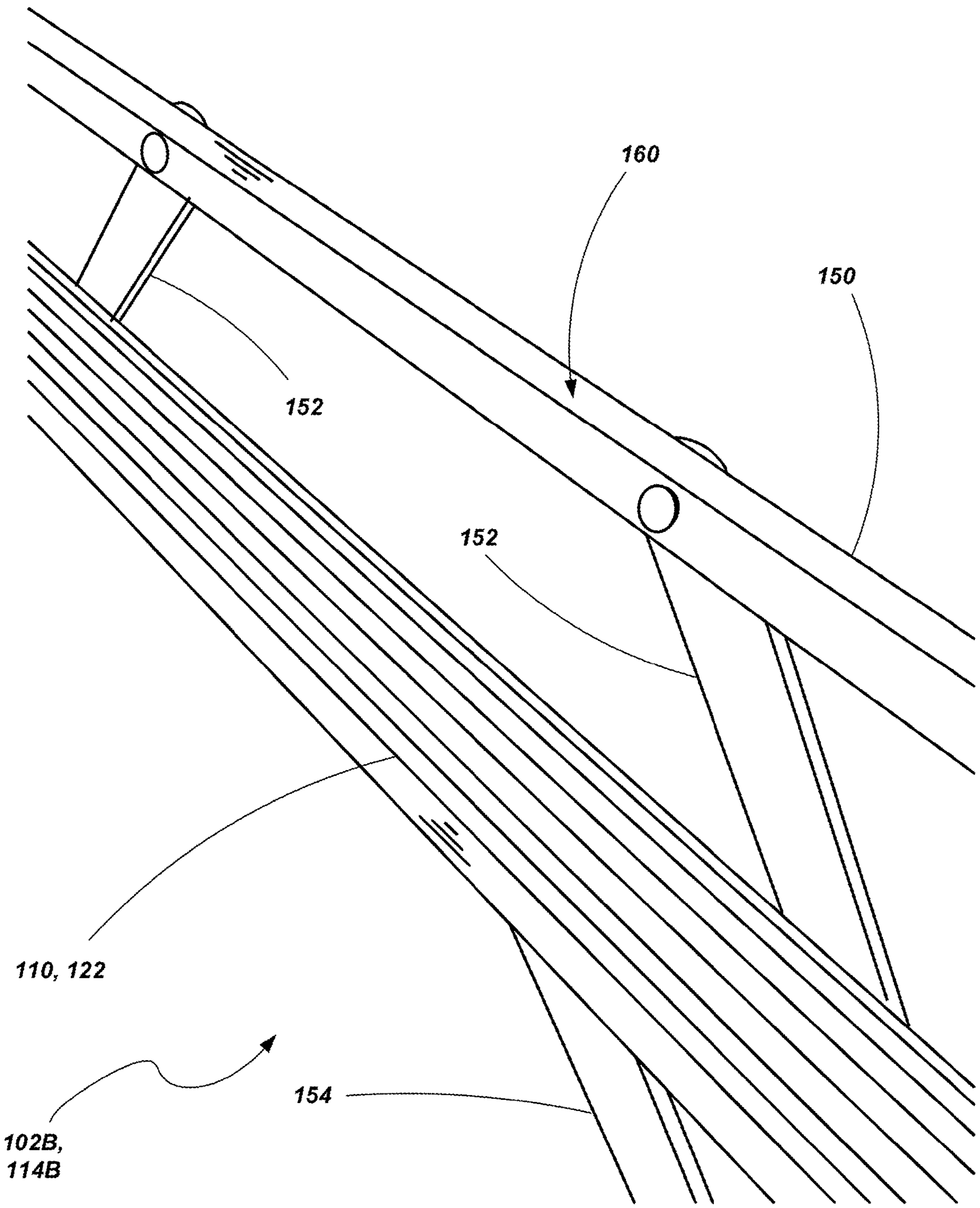
FIGS. 2 and 3 are perspective views of a portion of the ladder depicted in FIG. 1, including a brace member according to an embodiment of the present disclosure.
Figure 3:
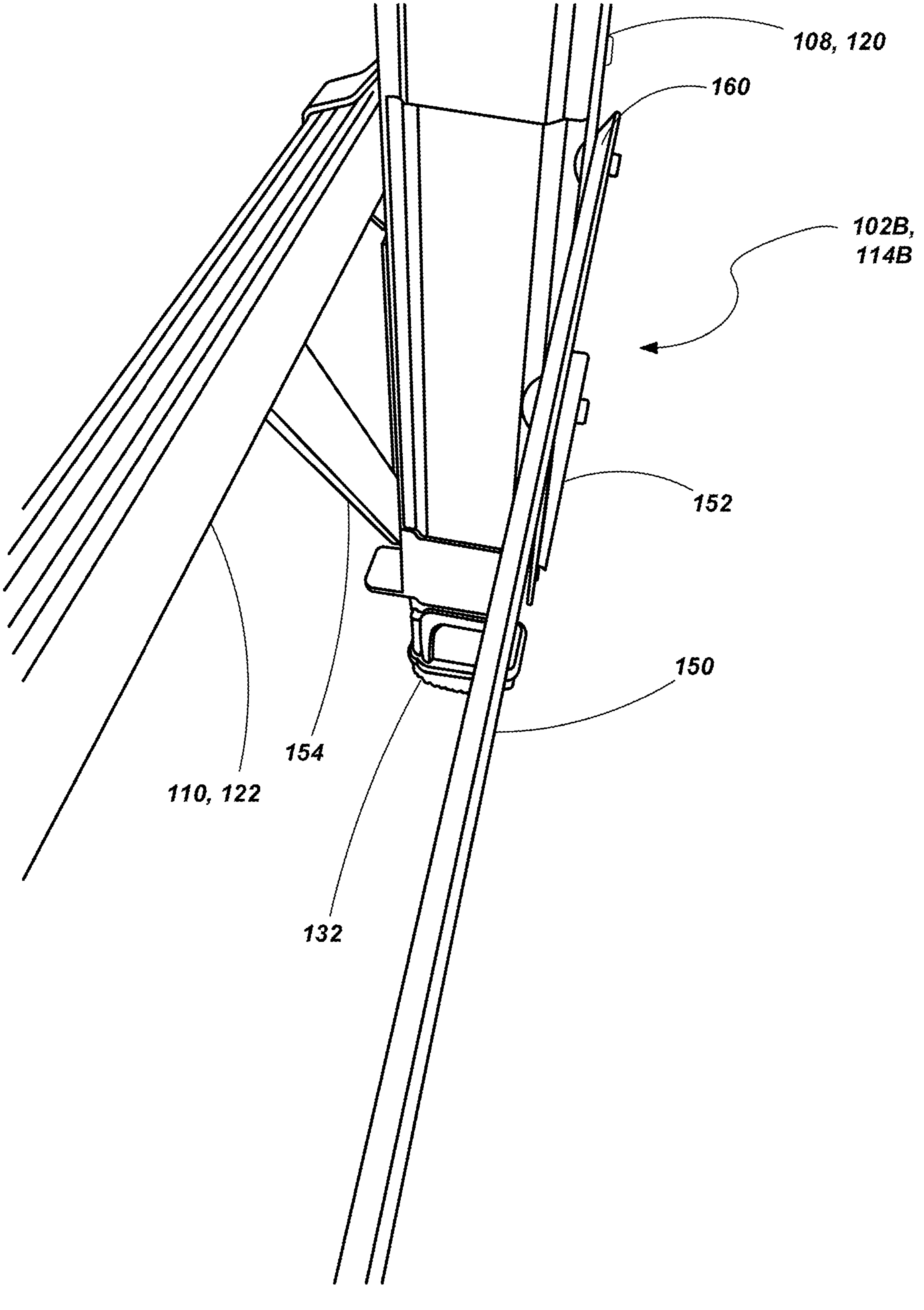
Figure 4:
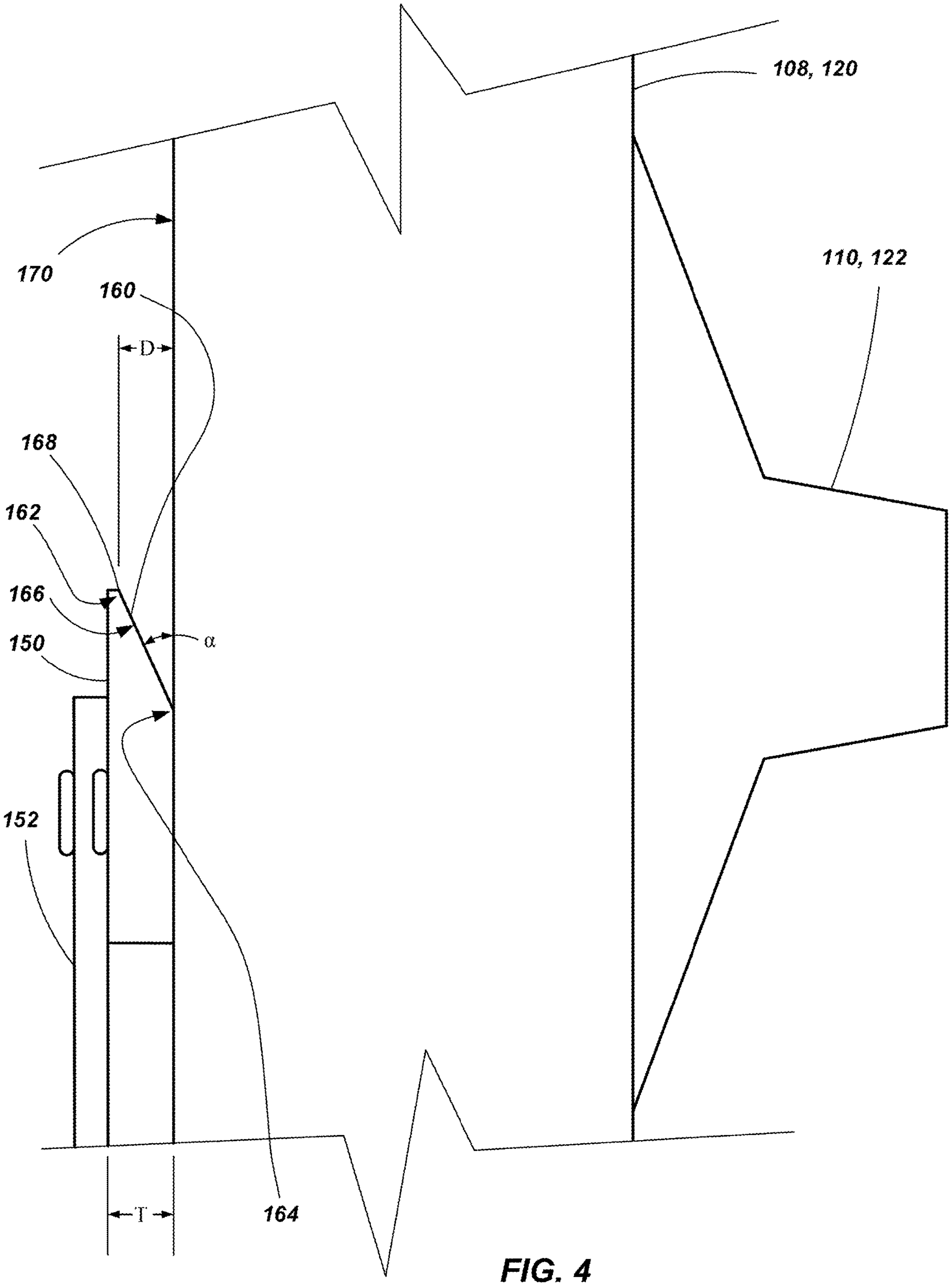
FIG. 4 is a side view of a portion of the ladder shown in FIG. 1 according to an embodiment of the present invention.

As seen in FIGS. 2-4, in one embodiment, the anti-catch feature may include a ramped surface 160 formed on the cross-brace 150. It is noted that the assembly shown in FIGS. 2-4 is representative of the outer assemblies 102B and 114B, including the outer rails 108 of the first assembly 102 as well as the outer rails 120 of the second assembly 114, and are labeled as such.

The ramped surface 160 may include an upper portion 162 (i.e., a portion distal or further from the feet of the associated rails 108, 120) which is spaced away from the plane of the rear surfaces 170 of the outer rails (108, 120). In one embodiment, the upper portion 162, or the transition edge between the upper most surface 168 of the cross-brace and the ramped surface 160, may be spaced from the rear surfaces of the outer rails (108, 120) a distance "D" of between approximately ⅛ inch (in.) and ⅜ in. For example, in one embodiment, cross-brace may exhibit a thickness "T" of approximately ¼ in. while the distance D may be between approximately 3/16 in. and 5/32 in.

The ramped surface 160 may include a lower portion 164 (i.e., a portion located proximal or closer to the feet of the rails than is the upper portion) that is immediately adjacent the rear surface 170 of the outer rails 108, 120. A transition surface 166 is located between the upper portion 162 and the lower portion 164. In the embodiment shown in FIGS. 2-4, the ramped surface includes a generally planar surface (shown as a linear surface in the cross-sectional profile depicted in FIG. 4). Thus, as the inner rails 110 and 122 are displaced downward during the collapsing of the ladder 100, if they contact the cross-brace 150, slide down the ramped surface 160 rather than catching or getting "hung-up" on the cross-brace 150. In some embodiments, the ramped surface may form an angle α with the back surface 170 outer rails 108, 120 that is between approximately degrees and approximately 45 degrees. In some embodiments, the angle α may be between approximately 20 degrees approximately 40 degrees. In one embodiment, the angle may be approximately 40 degrees.

It is noted that, as shown in FIGS. 2 and 3, the ramped surface 160 extends across the entire length of the cross-brace 150 (i.e., from a first end that is coupled with a first outer rail 108, 120 to a second send that is coupled with a second outer rail 108, 120). In other embodiments, only a portion of the cross-brace 150 may include a ramped surface. For example, in one embodiment, only portions immediately adjacent the location of inner rails (104, 116) may include a ramped surface. In other embodiments, the ramped surface 160 may extend to coincide with the width of the inner rails 104, 116 of a respective assembly 102, 114.

Considering the cross-brace 150 shown in FIG. 4, in such an embodiment, the profile (or cross-sectional geometry as taken in a direction substantially orthogonal to its length) may be characterized as an irregular pentagon, or a closed geometry having five linear sides.

Figure 5:
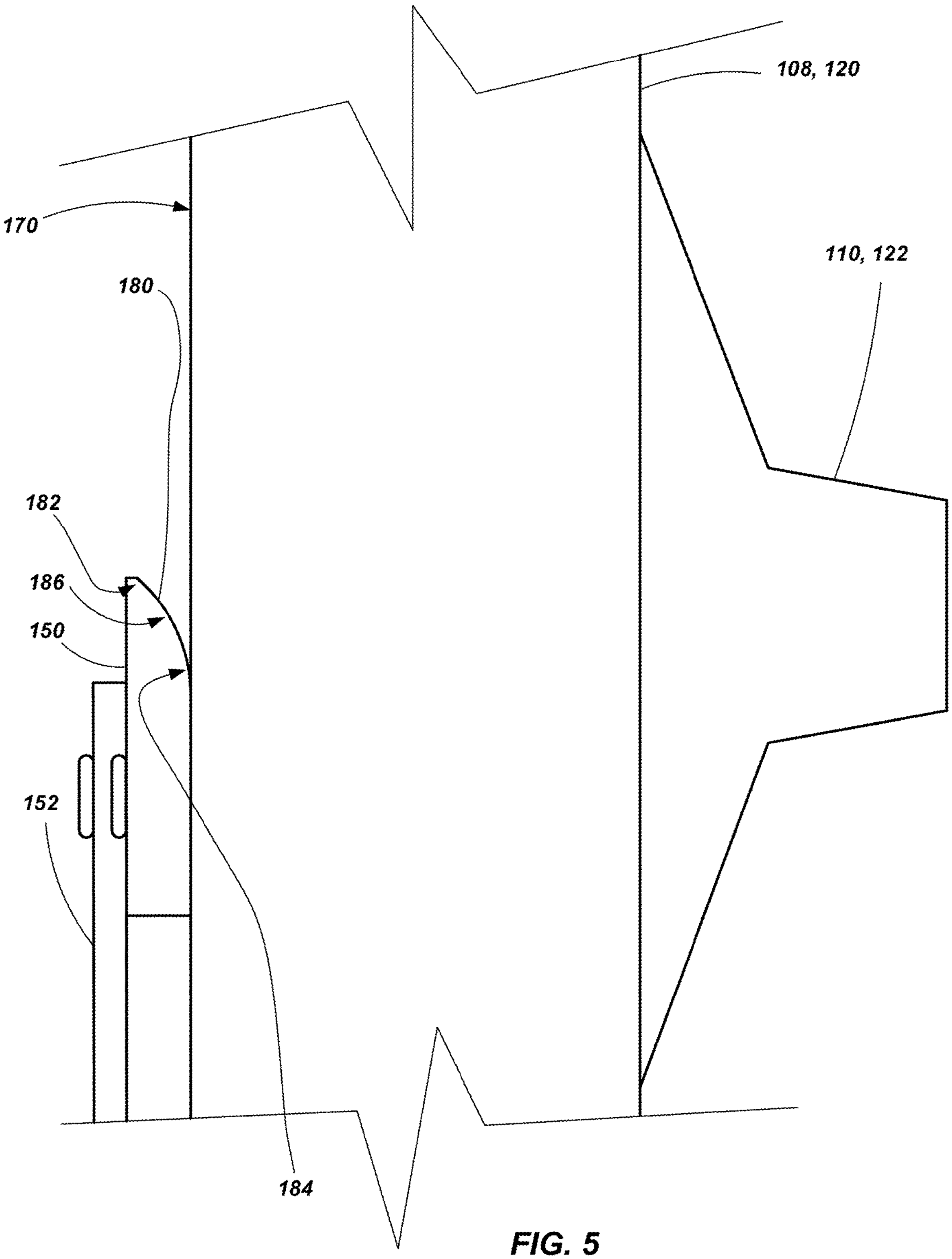
FIG. 5 is a side view of a portion of the ladder shown in FIG. 1 according to an embodiment of the present invention.

Referring to FIG. 5, a cross-brace 150 is shown in accordance with another embodiment and includes a ramped surface 180. The ramped surface 180 includes an upper portion and a lower portion as described above, but includes a transition portion 186 exhibiting a convex profile surface between its upper portion 182 and its lower portion 184. Considering the cross-brace 150 shown in FIG. 5, in such an embodiment, the profile (or cross-sectional geometry as taken in a direction substantially orthogonal to its length) may be characterized as a closed geometry having four linear sides and one curved or arcuate portion extending between two of the linear sides—in this case, a convex portion.

Figure 6:
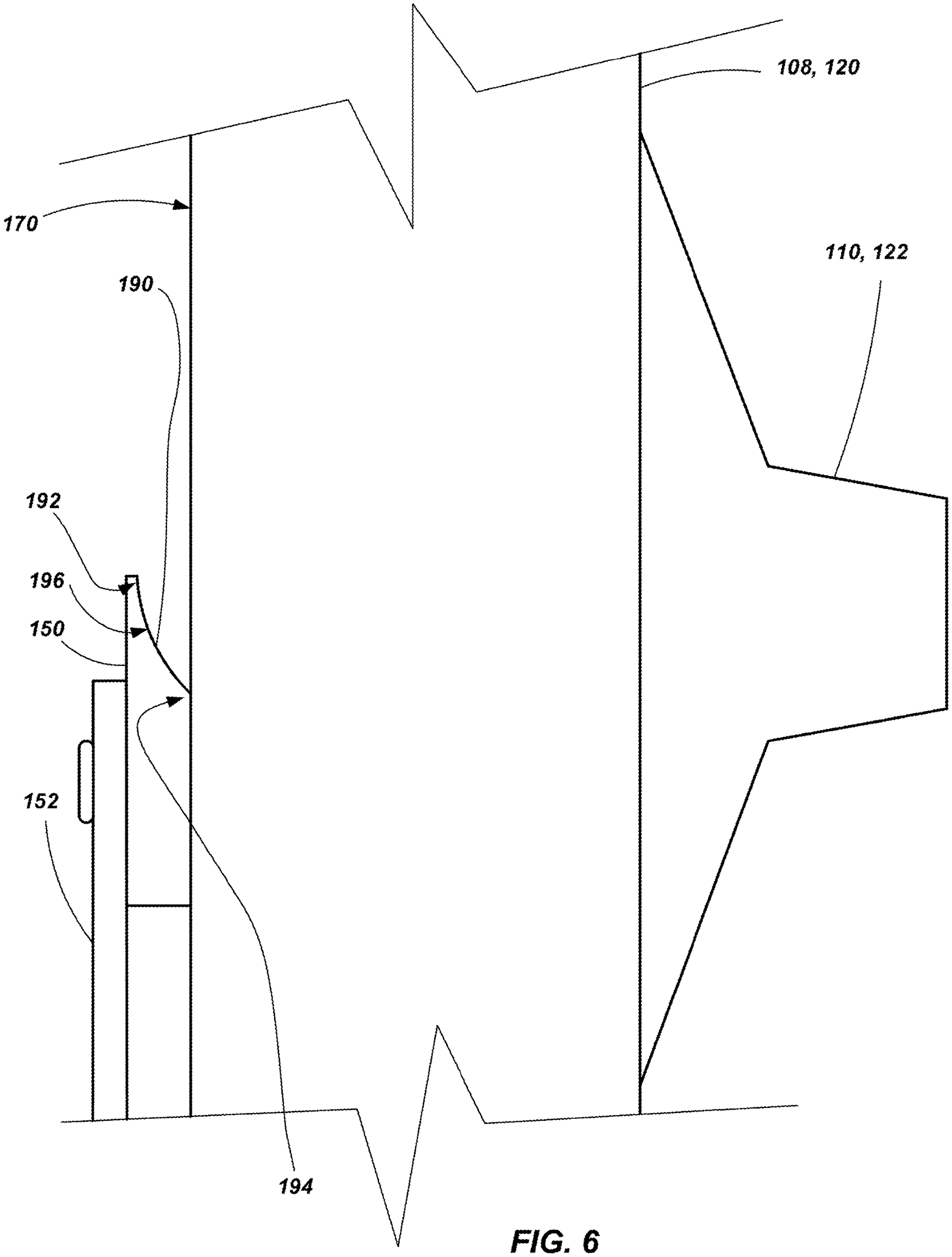
FIG. 6 is a side view of a portion of the ladder shown in FIG. 1 according to an embodiment of the present invention.

Referring to FIG. 6, a cross-brace 150 is shown in accordance with another embodiment and includes a ramped surface 190. The ramped surface 190 includes an upper portion and a lower portion as described above, but includes a transition portion 196 exhibiting a convex profile surface between its upper portion 192 and its lower portion 194. Considering the cross-brace 150 shown in FIG. 6, in such an embodiment, the profile (or cross-sectional geometry as taken in a direction substantially orthogonal to its length) may be characterized as a closed geometry having four linear sides and one curved or arcuate portion extending between two of the linear sides—in this case, a concave portion.

Figure 7:
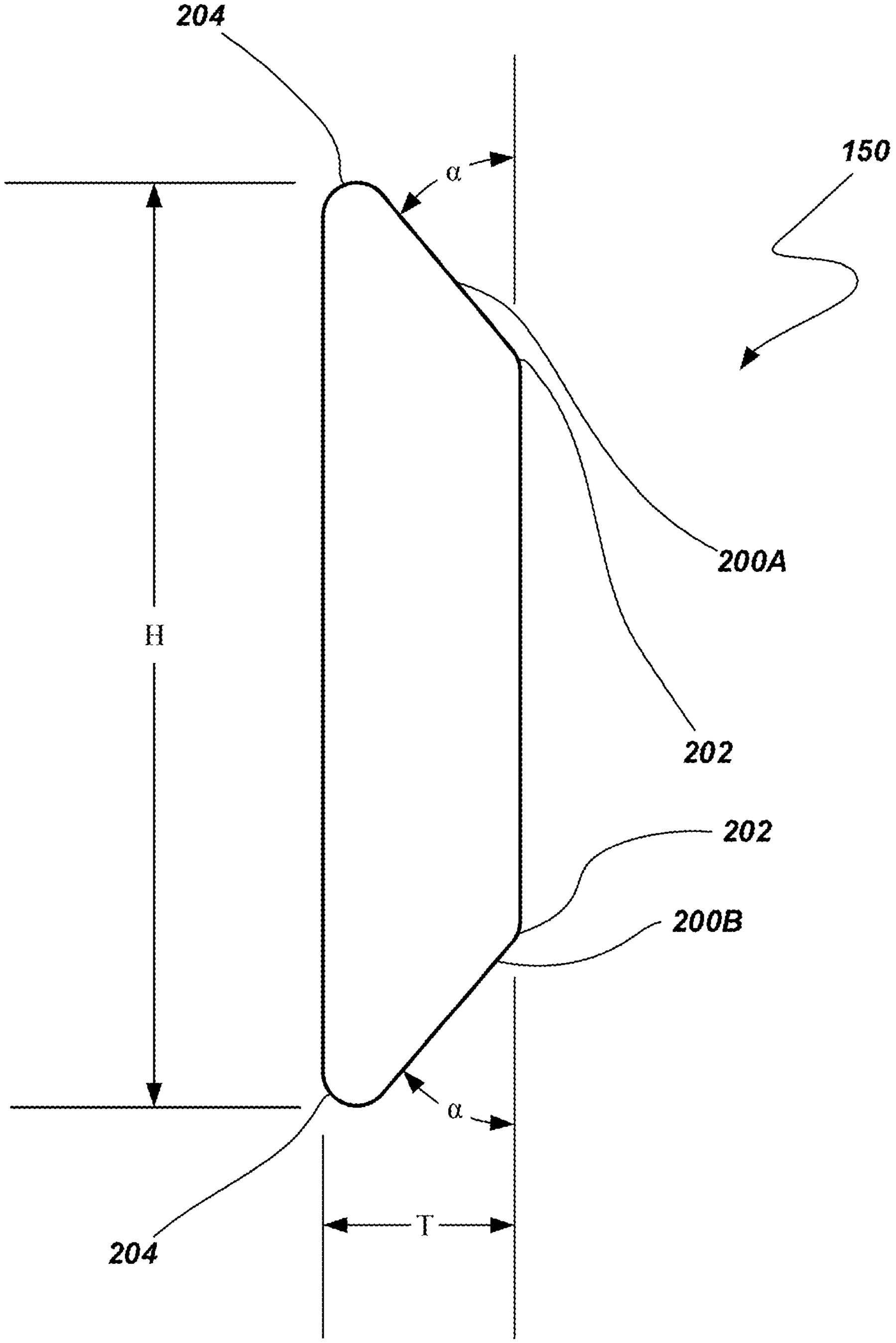
FIG. 7 is a side or profile view of a brace member in accordance with an embodiment of the present disclosure.

Referring to FIG. 7, a profile or side view of a cross-brace 150 is shown in accordance with another embodiment of the present disclosure. The cross-brace 150 may include a first ramped surface 200A along an upper portion of the profile, similar to the ramped surface described with respect to FIG. 4, as well as a second ramped surface 200B formed along a lower portion of the profile. In one embodiment, the ramped surfaces may be mirrored images of each other (e.g., in terms of size, angle, etc.). In other embodiments, the ramped surfaces 200A and 200B may exhibit individual and distinct characteristics.

In one embodiment, the ramped brace may exhibit an overall height "H" between approximately 1 inch and approximately 1.5 inches. In one embodiment, the height H may be approximately 1.136 inches, a thickness "T" of approximately ¼ inch, with the ramped surfaces 200A and 200B exhibiting angles α of approximately 40 degrees. In one embodiment, the corners or transitions 202 and 204 may be radiused to avoid sharp edges. In one embodiment, the corners 202 and 204 may be rounded to exhibit a radius of between approximately 0.05 inch and approximately 0.1 inch. In one particular example, the first set of radiused corners 202 may exhibit a radius of approximately 0.05 inch while the second set of radiused corners 204 may exhibit a radius of approximately 0.1 inch. Of course, other sizes and configurations are also contemplated including those discussed above. While the embodiment shown in FIG. 7 includes ramped surfaces that are substantially planar, the ramped surfaces may also be configured as curved surfaces, including convex and concave surfaces, such as been described above.

The inclusion of an upper ramped surface 200A and a lower ramped surface 200B may provide various advantages including, for example, ease of manufacturing and assembly (e.g., through the use of a symmetric component), as well as the ability to reduce or eliminate potential "catching" on the cross-brace from the feet of the ladder regardless of which direction the inner assembly is being displaced relative to the outer assembly.

While the invention may be susceptible to various modifications and alternative forms, specific embodiments have been shown by way of example in the drawings and have been described in detail herein. However, features or components of one embodiment may be combined, without limitation, with features or components of any other described embodiment. Additionally, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A ladder comprising:

a pair of inner rails; and a pair of outer rails, the pair of inner rails being slidably disposed in the pair of outer rails, wherein a rear surface of each outer rail of the pair of outer rails lies in a common plane, a first plurality of rungs coupled between the pair of inner rails, at least one brace extending between the pair of outer rails and directly coupled to the rear surface of each outer rail of the pair of outer rails, the at least one brace including:

a ramped surface, the ramped surface having a cross-sectional geometry including an upper portion spaced away from the common plane, a lower portion immediately adjacent the common plane, and a curved transition portion extending from the upper portion to the lower portion and facing toward the common plane.

2. The ladder of claim 1, wherein the curved transition portion includes a convex surface.

3. The ladder of claim 1, wherein the curved transition portion includes a concave surface.

4. The ladder of claim 1, wherein an upper most surface of the at least one brace includes a linear surface.

5. The ladder of claim 1, wherein the cross-sectional geometry includes four linear sides, and wherein the ramped surface is bounded between two of the four linear sides.

6. The ladder of claim 5, wherein:

an upper most surface of the cross-sectional geometry is a first linear side bounding the ramped surface at the upper portion; and a contact surface contacting the rear surface of each outer rail of the pair of outer rails forms a second linear side bounding the ramped surface at the lower portion.

7. The ladder of claim 1, wherein the ramped surface of the at least one brace extends substantially across an entire length of the at least one brace.

8. The ladder of claim 1, further comprising a pair of angle braces connected to the at least one brace and the rear surface of each outer rail of the pair of outer rails.

9. A ladder comprising:

a pair of inner rails and a pair of outer rails, the pair of inner rails being slidably disposed in the pair of outer rails, wherein a rear surface of each outer rail of the pair of outer rails lies in a common plane, a first plurality of rungs coupled between the pair of inner rails, a second plurality of rungs coupled between the pair of outer rails, a cross-brace extending between the pair of outer rails and directly coupled to the rear surface of each outer rail of the pair of outer rails, the cross-brace including:

an end surface spaced away from the common plane; and a ramped surface having a distal portion immediately adjacent the end surface, a proximal portion immediately adjacent the common plane, and a convex transition portion extending from the distal portion to the proximal portion;

wherein the pair of inner rails is configured to engage with the ramped surface in response to sliding the pair of inner rails within the pair of outer rails.

10. The ladder of claim 9, wherein the end surface is an upper most surface of the cross-brace.

11. The ladder of claim 9, wherein the cross-brace has a cross-sectional geometry including at least four linear sides and the ramped surface, wherein one of the at least four linear sides includes the end surface.

12. The ladder of claim 9, further comprising a second ramped surface positioned at a lower end of the cross-brace relative to the ramped surface, the second ramped surface having a second distal portion spaced away from the common plane, a second proximal portion immediately adjacent the common plane, and a curved transition portion extending from the second distal portion to the second proximal portion.

13. A ladder comprising:

a pair of inner rails; and a pair of outer rails, the pair of inner rails being slidably disposed in the pair of outer rails, wherein a rear surface of each outer rail of the pair of outer rails lies in a common plane, a first plurality of rungs coupled between the pair of inner rails, at least one brace extending between the pair of outer rails and directly coupled to the rear surface of each outer rail of the pair of outer rails, the at least one brace including:

a ramped surface, the ramped surface having a cross-sectional geometry including an upper portion spaced away from the common plane, a lower portion immediately adjacent the common plane, and a curved transition portion extending from the upper portion to the lower portion;

wherein:

the cross-sectional geometry includes four linear sides;

the ramped surface is bounded between two of the four linear sides;

an upper most surface of the cross-sectional geometry is a first linear side bounding the ramped surface at the upper portion; and a contact surface contacting the rear surface of each outer rail of the pair of outer rails forms a second linear side bounding the ramped surface at the lower portion.

* * * * *